United States Patent
Kjellin et al.

(10) Patent No.: US 11,010,087 B2
(45) Date of Patent: May 18, 2021

(54) SYSTEM AND METHOD FOR CONSISTENT MIRRORING IN A CLUSTER

(71) Applicants: Atlassian Pty Ltd, Sydney (AU); Atlassian, Inc., San Francisco, CA (US)

(72) Inventors: Per Daniel Kjellin, Sydney (AU); Wolfgang Franz Kritzinger, Sydney (AU); Manish Goyal, Sydney (AU); Daniel Lane Reissenberger, Sydney (AU); Richard Friend, Sydney (AU); Chandravadan Subraveti, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 0 days.

(21) Appl. No.: 16/555,699

(22) Filed: Aug. 29, 2019

(65) Prior Publication Data
US 2020/0310651 A1    Oct. 1, 2020

Related U.S. Application Data

(60) Provisional application No. 62/826,044, filed on Mar. 29, 2019.

(51) Int. Cl.
*G06F 12/00*    (2006.01)
*G06F 3/06*    (2006.01)

(52) U.S. Cl.
CPC ............. *G06F 3/065* (2013.01); *G06F 3/067* (2013.01); *G06F 3/0619* (2013.01)

(58) Field of Classification Search
CPC combination set(s) only.
See application file for complete search history.

(56) References Cited

U.S. PATENT DOCUMENTS

| | | | |
|---|---|---|---|
| 8,725,967 B2 * | 5/2014 | DeSantis | G06F 3/0622 711/162 |
| 8,775,381 B1 * | 7/2014 | McCline | G06F 16/2386 707/658 |
| 9,405,483 B1 * | 8/2016 | Wei | G06F 3/065 |
| 2014/0101099 A1 * | 4/2014 | Driesen | G06F 16/273 707/610 |
| 2015/0370648 A1 * | 12/2015 | Mashima | G06F 11/2041 707/658 |
| 2016/0371357 A1 | 12/2016 | Park et al. | |

* cited by examiner

*Primary Examiner* — John A Lane
(74) *Attorney, Agent, or Firm* — Brownstein Hyatt Farber Schreck, LLP

(57) ABSTRACT

Described herein is a computer implemented method for consistent distributed mirroring of data maintained by a primary cluster. The method comprises removing, by one mirror node of multiple mirror nodes, a change notification from a change queue shared between multiple mirror nodes; initiating an update process for the data corresponding to the change notification; and fetching one or more objects corresponding to the change notification from the primary cluster. Designated temporary slave mirror nodes notify a designated temporary master mirror node that fetching objects is complete, and the temporary master mirror node notifies the temporary slave mirror nodes that the update process is complete once a notification is received from each of the temporary slave mirror nodes.

20 Claims, 4 Drawing Sheets

SYSTEM AND METHOD FOR CONSISTENT MIRRORING IN A CLUSTER

BENEFIT CLAIM

This application claims the benefit under 35 U.S.C. 119(e) of provisional application 62/826,044, filed Mar. 29, 2019, the entire contents of which are hereby incorporated by reference for all purposes as if fully set forth herein.

FIELD OF THE DISCLOSURE

One technical field of the present disclosure is computer systems and computer-implemented methods for mirroring data in distributed computer systems. Another technical field is computer programs for mirroring data in a distributed environment to ensure data remains consistent between multiple mirror nodes.

BACKGROUND OF THE INVENTION

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

In general terms, a mirror is a replica of one or more servers, such as a primary cluster of a source code repository. A mirror can act in place of the primary cluster such as for responding to certain requests from users without the requests being handled by the primary cluster at all. As a result, a mirror can enable a reduction in network traffic on the primary cluster, as many user requests can be handled independently by the mirror itself. A mirror may also result in wider availability of services and faster access to users.

A mirror may be one of multiple networked mirror nodes. That is a mirror node is a networked computer configured to operate as a mirror. Each of the mirror nodes, which together can be referred to as a cluster or mirror farm, hosts a copy of data or content that is maintained on a primary server or cluster and acts together to serve the copy of the content to users. A system architecture with a mirror farm can enable an improvement in access speed for users as the mirror nodes can act in parallel in response to user requests. A mirror farm may scale in size as the number of users/requests, and therefore usage of the mirror farm, increases.

A typical system architecture that utilizes a mirror farm would be appropriate where the multiple mirror nodes serve the same content, but the content doesn't change often (such as a mirror for a static website etc.). Where the content is changing relatively frequently, it is harder to maintain consistency between mirror nodes. This is the case with source code repositories, where the content (source code) is frequently changing. Therefore, there is a need for a mirroring system that operates to mirror content consistently and efficiently where the mirrored content is frequently changing.

Consistency of data is a significant problem in mirroring many types of data, but it is particularly a problem in mirroring source code because the content is changing frequently in many cases. As a result, most current solutions use a shared database or alternatively shards (fragments of the content) instead of mirroring. Each of those solutions generally require a master node of some kind which introduces a single point of failure and can be a bottleneck in terms of efficient usage of computational resources. Therefore, there is a need to provide a more distributed solution such that the single point of failure and the bottleneck problem is reduced.

SUMMARY OF THE INVENTION

The appended claims may serve as a summary of the invention.

Figure 1:
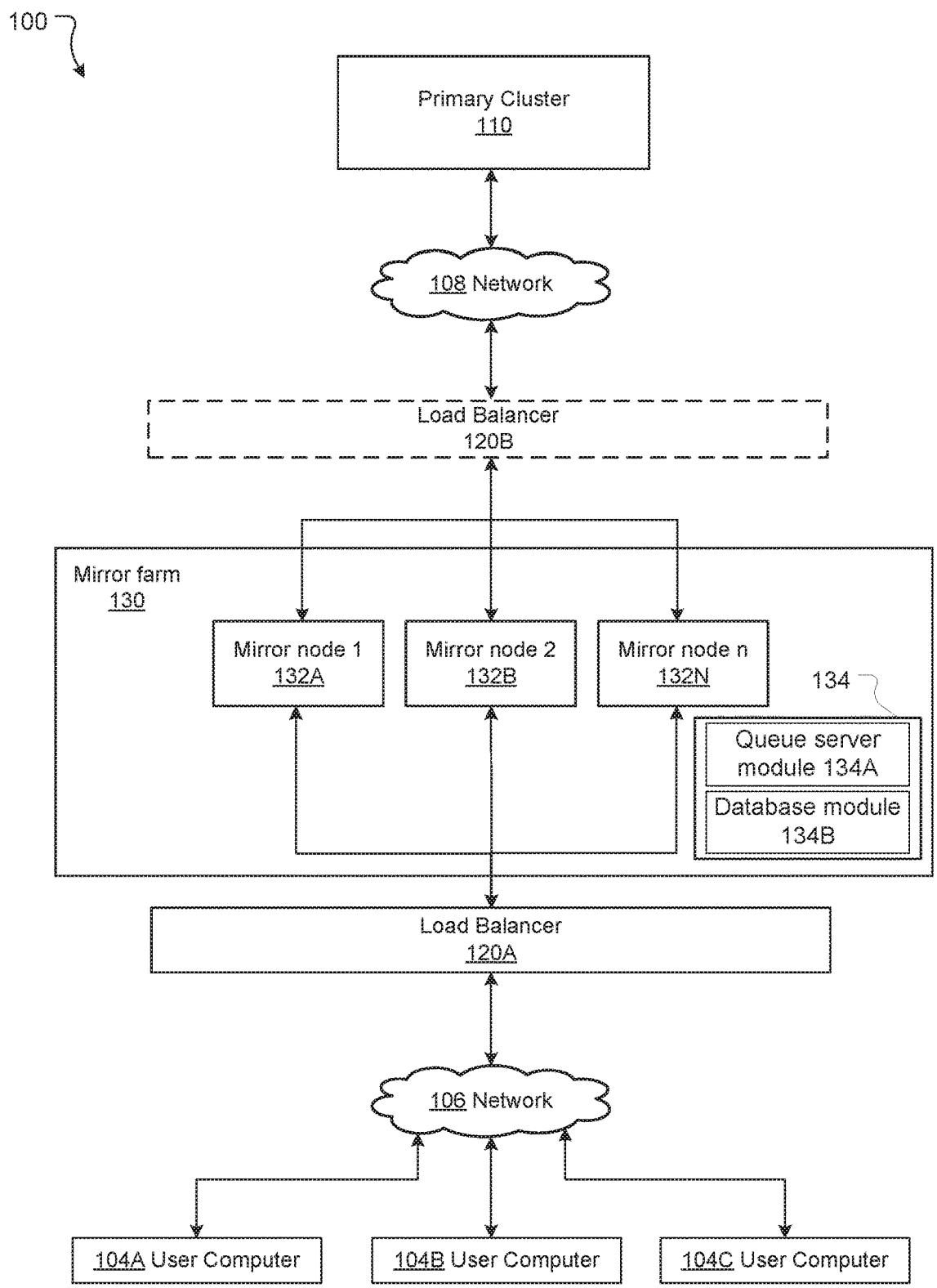
FIG. 1 is a block diagram of a networked environment according to aspects of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF THE EMBODIMENTS

Overview

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

This disclosure relates to systems and methods for consistent distributed mirroring of a primary cluster. In particular this disclosure relates to maintaining mirror nodes with examples of a source code repository with a load balanced primary cluster. The mirror nodes in a mirror farm operate to serve references to objects (refs) to clients without interacting with the source code repository. In some embodiments, the mirror nodes in the mirror farm include references to objects (refs) and objects, both of which may be read from the source code repository.

It is noted that in this disclosure reference is made to primary cluster for simplicity but equally the primary cluster could be an originating source of any kind including a server, cloud, file or networked computer.

The replication of a server, such as a primary cluster, as a mirror node involves synchronizing a mirror node's datastore with the datastore of the primary cluster. In this disclosure, the data of the primary cluster is referred to as the primary content. The data of a mirror node, which is a copy of the primary content created and stored on the mirror node, is referred to as mirrored content. Each mirror node maintains its own view or representation of the mirrored content. The view is what will be served to a user in response to a user request. This means that a mirror node can update the mirrored content while simultaneously serving a view of the mirrored content (that is, the old content prior to the update).

In the following disclosure there are multiple mirror nodes which together form a mirror farm, that is, a collection of computer servers where each of the servers is a mirror node that hosts a copy of a primary server or cluster and acts to serve mirrored content. This set of mirror nodes is grouped together in a way that will provide a consistent view of their contents to the outside observer. That is, a mirror node should not serve a view of the updated mirrored content unless all the mirror nodes have finished updating the mirrored content.

In this disclosure references are made to two types of mirror nodes: temporary master mirror node and temporary slave mirror node. This designation relates to a role of the mirror node in relation to a specific update of the primary content that needs to be synchronized with the mirror nodes. For a given update one mirror node assumes the temporary master mirror node role and all other mirror nodes assume a temporary slave mirror node role. The designation of temporary master mirror node means the mirror node is to exclusively manage synchronizing itself and the other mirror nodes with the primary cluster. The designation of temporary slave mirror node means the mirror node is to receive commands and notifications in relation to the specific update. In this disclosure, the designation of temporary master mirror node and temporary slave mirror node does not require an actual notification sent between the mirror nodes, although notification may occur.

As will be explained in more detail below, the embodiments described herein use a change queue that is shared between all the mirror nodes. In some embodiments this change queue is a distributed queue. Each time primary content is updated (e.g. a change is made to the data/content being maintained by the primary sever/cluster), a change notification message is added to the change queue.

Any mirror node can inspect the queue and begin an update process in relation to the change notification that is queued. A mirror node that begins the update process becomes a temporary master mirror node for the purposes of ensuring all the mirror nodes are synchronized in relation to the change.

At a high level, the update process includes the following steps—
1. A mirror node removes a change notification in the change queue becoming a temporary master mirror node.
2. The temporary master mirror node communicates with the primary cluster (for example, upstream repository) to get the latest update of the primary content and notifies the other temporary slave mirror nodes in the mirror farm of the latest update.
3. The temporary master mirror node and the temporary slave mirror nodes in turn retrieve objects associated with the update from the primary cluster.
4. The temporary slave mirror nodes notify the temporary master mirror node when they have finished fetching the associated objects.
5. Once the temporary master mirror node receives notification from all the temporary slave mirror nodes, it instructs the mirror nodes to update their representations (views) of the repository.

As any mirror node can become a temporary master mirror node, there is no need for a complex load balancer/controller as the load balancing can be handled within the mirror farm. Further still, by updating the repository representations only after all the mirror nodes have fetched the objects, the method allows for any mirror node in the mirror farm to fulfil an object request made by a user at any other node in the mirror farm.

In high volume systems mirror farms often reside behind a load balancer. This means that there is typically no control over which mirror receives requests via the load balancer. Consistency in the context of this disclosure means providing a consistent view of the mirrored content contained within a mirror group to any client no matter which individual mirror they land on.

Example System

FIG. 1 illustrates an example system for a consistent mirror farm. In this example, there are three user computers 104A, 104B, 104C. Each of these computers is connected to a network 106. The network 106 could be a suitable network of any kind such as the internet. Also connected directly to the network 106 is a load balancer 120A. A load balancer is a device that acts to distribute network and application traffic across a number of servers. In this case, the load balancer 120A acts to distribute network and application traffic between the mirror nodes 132 in the mirror farm 130. If multiple users request data that is mirrored on the mirror nodes 132 then the load balancer 120A acts to ensure that the requests are handled by different mirror nodes rather than being all handled by one mirror and unduly burdening it.

It is important to note that mirror nodes 132 are, from the perspective of a user, read only. Changes can be made to the mirror nodes 132 but typically only via a specific mechanism that ensures that the mirror nodes are kept synchronized. This means that mirror nodes generally only serve read requests. If a user request involves a modification to the primary content, this request is made to and handled by the primary cluster 110 which will in turn update the mirror nodes via the appropriate mechanism.

There is optionally a second load balancer 120B between the mirror farm 130 and the primary cluster 110. When a user pushes a change to a repository, the primary cluster 110 will need to update itself and notify the mirror nodes to update their data as well. The load balancer 120B can act to ensure that the notifications (and other requests) from the primary cluster are shared among the mirror nodes.

Example Environment

Figure 2A:
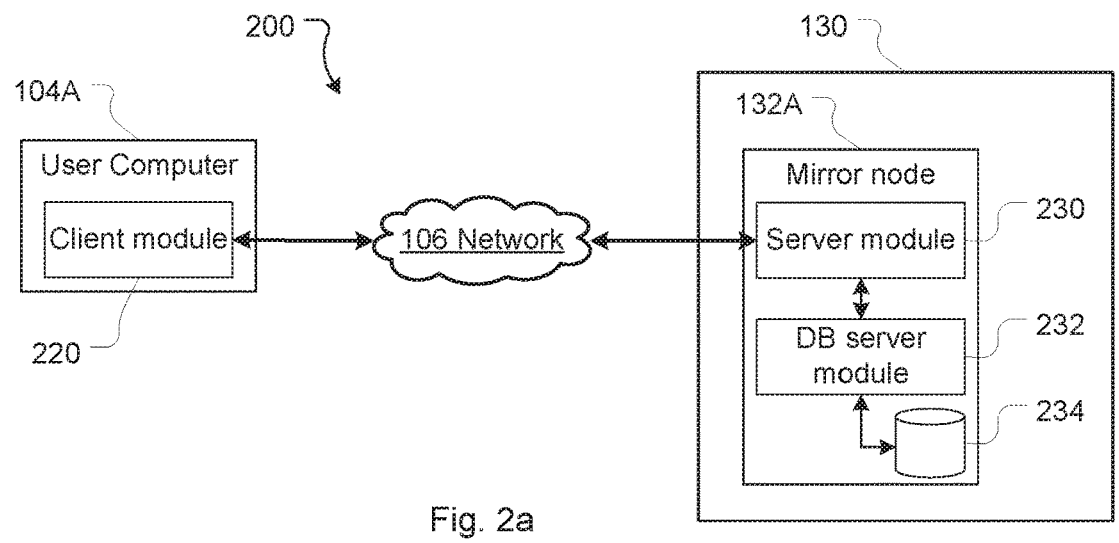
FIG. 2a is a block diagram of an example user computer and mirror.

FIG. 2a illustrates an example environment 200 in which embodiments and features of the present disclosure are implemented. Example environment 200 includes a communications network 106 which interconnects a user computer 104A, a mirror farm 130, of which the example mirror node 132A is depicted.

A mirror node, such as mirror node 132A, includes a mirror server module 230, a database server module 232 and a data store 234. The mirror server module 230 configures the mirror node 132A to provide server side mirror functionality—e.g. by receiving and responding to requests from user computers 104A, 104B, 104C particularly the client applications on such devices (e.g. client module 220) and retrieving data from the data store 234 as required.

The mirror server module 230 also configures the mirror node 132A to provide server side functionality to coordinate with the primary cluster 110 and other mirror nodes 132B, 132C (not illustrated here for simplicity) to ensure the datastore 234 remains synchronized within the mirror farm 130. Importantly, it is the view or representation of the mirrored content that is served to users. This is so that there is consistency from the user's perspective. Serving a view rather than the mirrored content itself is important because a mirror node may not update, be overloaded or simply fail and create inconsistency. As a result, synchronization should result in consistency between the data in the datastore 234 and the data in the datastores of the other mirror nodes 132B, 132C. It should also result in consistency between the mirror farm and the primary cluster 110. This means that the datastore 234 should be updated whenever a user makes a change to the primary cluster's version of the same data, although some lag between an update to the primary content and the datastores in the mirror farm is inevitable.

Mirror node 132A may be a web server (for interacting with web browser clients) or an application server (for interacting with dedicated application clients). While mirror node 132A has been illustrated with a single server application 230, it may provide multiple server applications (e.g. one or more web servers and/or one or more application servers).

In certain embodiments, a mirror node may be a mirror farm itself including multiple distributed nodes connected to a shared data store 224 (e.g. a shared file server). Depending on demand from clients (and/or other performance requirements), additional mirror nodes can be provisioned/de-provisioned on demand to increase/decrease the number of servers offered by the mirror farm 130. Each mirror server module 230 may run on a separate computer system and include one or more application programs, libraries, APIs or other software that implement server-side functionality. Similarly, the mirror database server 232 may run on the same computer system as the server module 230, or may run on its own dedicated system (accessible to mirror server module 230 either directly or via a communications network such as network 106, 108).

User computer 104A is a computer processing system with a client application 220 installed thereon. When executed by the user computer 104A (e.g. by a processor thereof) the client module 220 configures the user computer 104A to provide client-side system functionality by communicating (using a communication interface) with the mirror farm 130. In many scenarios, a load balancer such as 120A (not depicted here for simplicity) will direct a communication by the client to one of the servers 132 in the mirror farm 130. A mirror node such as mirror node 132A can respond to a read request from the user computer 104A. The mirror nodes in the mirror farm 130 will typically not be configured to respond to a write request received directly from a user computer 104. Instead, requests to change the primary content are made to the primary cluster 110 and propagate through to the mirror nodes 132 in the mirror farm 130 as discussed further below.

The client module 220 may be a dedicated application client that communicates with an application server (such as, in many examples in this disclosure, a source code server for instance GIT or Bitbucket) using an API. Alternatively, the client module 220 may be a web browser (such as Chrome, Safari, Internet Explorer, Firefox, or an alternative web browser) which communicates with a web server using http/https protocols.

User computer 104A may be any form of computing device. Typically, user computer 104A will be a personal computing device—e.g. a desktop computer, laptop computer, tablet computer, and in some instances even a mobile phone. While a single user computer 104A has been illustrated, an environment would typically include multiple user computers (such as multiple user computers 104A, 104B, 104C) interacting with the mirror farm 130 and multiple mirror nodes (such as mirror nodes 132B, 132C) handling requests by multiple user computers.

Figure 2B:
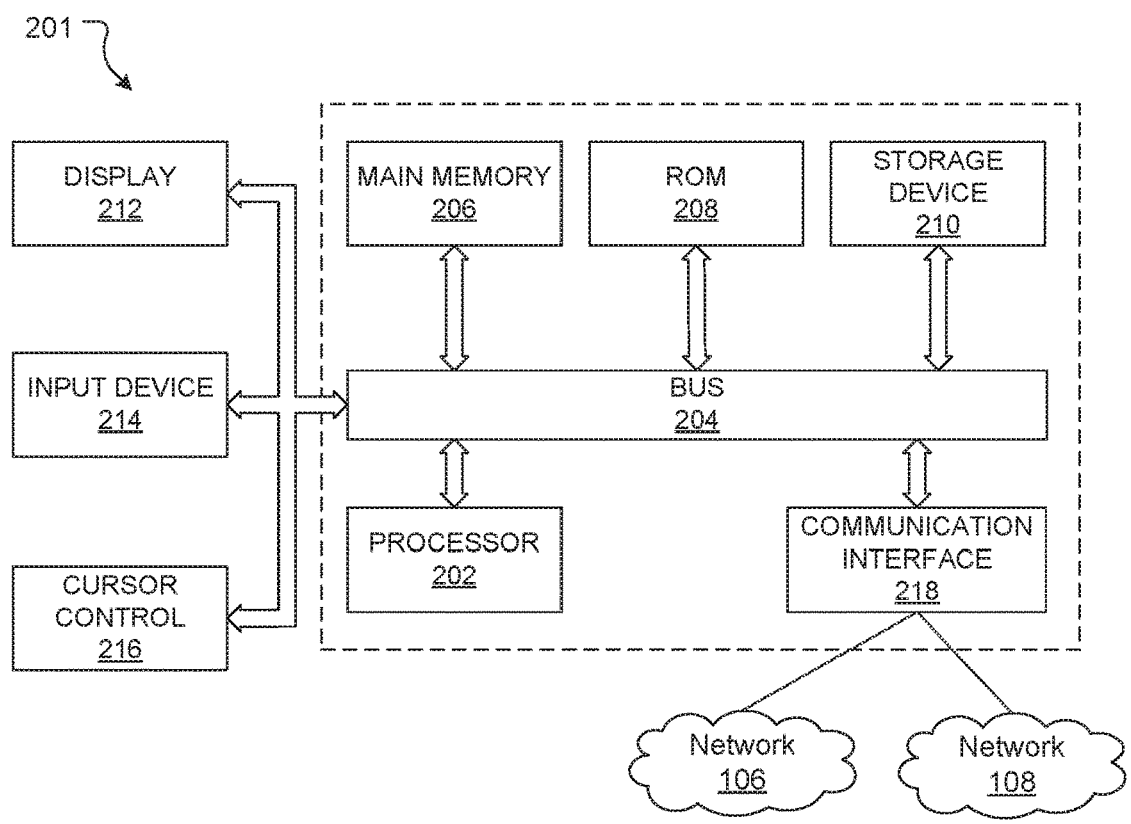
FIG. 2b is a block diagram of an example mirror.

FIG. 2b provides a block diagram of a general-purpose computer processing system configurable to operate (either alone or in conjunction with other computer processing systems) as a primary cluster 110, mirror node 132, or user computer 104. System 201 as illustrated in FIG. 2b is a general-purpose computer processing system operating as a mirror node. It will be appreciated that FIG. 2b does not illustrate all functional or physical components of a computer processing system. For example, no power supply or power supply interface has been depicted, however system 201 will either carry a power supply or be configured for connection to a power supply (or both). It will also be appreciated that the particular type of computer processing system will determine the appropriate hardware and architecture, and alternative computer processing systems suitable for implementing aspects of the invention may have additional, alternative, or fewer components than those depicted, combine two or more components, and/or have a different configuration or arrangement of components.

As noted, computer system 201 may be configured in a plurality of useful arrangements, and while the general architecture of system 201 may be the same regardless of arrangements there will be differences. For example, where computer system 200 is configured as a mirror node (such as mirror node 132A), it will typically be provided with higher end hardware allowing it to process data, access memory, and perform network communications more rapidly than, for example, a user computer (such as user computer 104A).

Computer system 201 includes a bus 204 or other communication mechanism for communicating information, and a hardware processor 202 coupled with bus 204 for processing information. Hardware processor 202 may be, for example, a general purpose microprocessor, a graphical processing unit, or other processing unit. The processing unit 202 may be a single computer-processing device (e.g. a central processing unit, graphics processing unit, or other computational device), or may include a plurality of computer processing devices. In some instances, all processing will be performed by processing unit 202, however in other instances processing may also, or alternatively, be performed by remote processing devices accessible and useable (either in a shared or dedicated manner) by the system 201.

Computer system 201 also includes a main memory 206, such as a random access memory (RAM) or other dynamic storage device, coupled to bus 204 for storing information and instructions to be executed by processor 202. Main memory 206 also may be used for storing temporary variables or other intermediate information during execution of instructions to be executed by processor 202. Such instructions, when stored in non-transitory storage media accessible to processor 202, render computer system 201 into a special-purpose machine that is customized to perform the operations specified in the instructions.

Computer system 201 further includes a read only memory (ROM) 208 or other static storage device coupled to bus 204 for storing static information and instructions for processor 202. A storage device 210, such as a magnetic disk or optical disk, is provided and coupled to bus 204 for storing information and instructions.

Computer system 201 also includes a communication interface 218 coupled to bus 204. System 201 may connect to communications networks 106 and 108 (which may be for e.g. the Internet, a local area network, a wide area network, a personal hotspot etc.) to communicate data to and receive data from networked devices, which may themselves be other computer processing systems.

Communication interface 218 provides a two-way data communication coupling to a communication network, for example communication network 102 of environment 100.

For example, communication interface 218 may be an integrated services digital network (ISDN) card, cable modem, satellite modem, etc. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Computer system 201 can send messages and receive data, including program code, through the network(s) 106, 108 and communication interface 218.

In case the computer system 201 is the user computer 104A, the computer system 200 may be coupled via bus 204 to a display 212 (such as an LCD, LED, touch screen display or other display), for displaying information to a computer user. System 201 may also include or connect to devices which may act as both input and output devices, for example memory devices (hard drives, solid state drives, disk drives, compact flash cards, SD cards and the like) which system 201 can read data from and/or write data to, and touch-screen displays which can both display (output) data and receive touch signals (input). An input device 214, including alphanumeric and other keys, may be coupled to the bus 204 for communicating information and command selections to processor 202. Another type of user input device is cursor control 216, such as a mouse, a trackball, or cursor direction keys for communicating direction information and command selections to processor 202 and for controlling cursor movement on display 212.

According to one embodiment, the techniques herein are performed by computer system 201 in response to processor 202 executing one or more sequences of one or more instructions contained in main memory 206. Such instructions may be read into main memory 206 from another storage medium, such as a remote database. Execution of the sequences of instructions contained in main memory 206 causes processor 202 to perform the process steps described herein. In alternative embodiments, hard-wired circuitry may be used in place of or in combination with software instructions.

The term "storage media" as used herein refers to any non-transitory media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 204. Transmission media can also take the form of acoustic or light waves, such as those generated during radio-wave and infra-red data communications.

Wired connection with other devices/networks may be by any appropriate standard or proprietary hardware and connectivity protocols. For example, system 201 may be configured for wired connection with other devices/communications networks by one or more of: USB; FireWire; eSATA; Thunderbolt; Ethernet; OS/2; Parallel; Serial; HDMI; DVI; VGA; SCSI; AudioPort. Other wired connections are, of course, possible.

Wireless connection with other devices/networks may similarly be by any appropriate standard or proprietary hardware and communications protocols. For example, system 201 may be configured for wireless connection with other devices/communications networks using one or more of: infrared; Bluetooth; Wi-Fi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are, of course, possible.

It will be appreciated that system 201 may be any suitable computer processing system such as, by way of non-limiting example, a desktop computer, a laptop computer, a netbook computer, tablet computer, a smart phone, a Personal Digital Assistant (PDA), a cellular telephone, a web appliance. Typically, system 201 will use the communications interface 218 for communication with a network 108 or network 106. In these examples, the network 106 and network 108 may be the same even though they are illustrated as different networks. The number and specific types of devices which system 201 includes or connects to will depend on the particular type of system 201. For example, if system 201 is a desktop computer it will typically connect to physically separate devices such as (at least) a keyboard, a pointing device (e.g. mouse), a display device (e.g. an LCD display). Alternatively, if system 201 is a laptop computer it will typically include (in a physically integrated manner) a keyboard, pointing device, a display device, and an audio output device. Further alternatively, the system could be a virtual machine or other emulation of a computer system.

System 201 stores or has access to instructions and data which, when processed by the processing unit 202, configure system 201 to receive, process, and output data. Such instructions and data will typically include an operating system such as Microsoft Windows®, Apple OSX, Apple 105, Android, Unix, or Linux.

System 201 also stores or has access to instructions and data (i.e. software) which, when processed by the processing unit 202, configure system 201 to perform various computer-implemented processes/methods in accordance with embodiments of the invention (as described below). It will be appreciated that in some cases part or all of a given computer-implemented method will be performed by system 201 itself, while in other cases processing may be performed by other devices in data communication with system 201.

Instructions and data are stored on a non-transient machine-readable medium accessible to system 201. For example, instructions and data may be stored on non-transient memory 210 Instructions may be transmitted to/received by system 201 via a data signal in a transmission channel enabled (for example) by a wired or wireless network connection.

In some embodiments, mirror nodes in a mirror farm may take control of ref advertisement. This may allow the mirror farm to only advertise objects that have been synchronized to all mirror nodes for the purpose of consistency.

Example Change Queue

As above, the proposed method uses a change queue 134 that is shared between all the mirror nodes in the mirror farm 130. This change queue 134 is a means for ensuring that the changes to the primary cluster 110 are updated in a timely manner as changes would generally be processed chronologically. That is, older changes would generally be processed before new changes. Significantly, each time primary content is updated, for example, a change is made upstream which in source code repository terms is the original code on the primary cluster 110 that is being mirrored, a change notification message is added to the change queue. Returning to the example of FIG. 1, the change queue 134 comprises a queue server module 134A which acts to add change notification messages. Queue data may be stored at database module 134B.

In some embodiments, the change queue 134 is a distributed queue. A distributed queue is a queue that operates on a distributed system in a way that replicates a queue on a single system. The backend of a distributed queue, which in this example is the database module 134B may be a replicated database. As a replicated database, the queue database module 134B uses a replication protocol to make sure the message (that is, in this disclosure a change notification) is on at least a specified number of hosts before acknowledging receipt to the sender. These hosts may be mirror nodes in the mirror farm 130 or they may be independent to the mirror farm. Common replication protocols are 2PC, 3PC, and consensus protocols like Raft, Multi-Paxos, and Chain Replication. The distributed queue may send a message to a receiver by a similar replication protocol with a message lease. The queue server 134A reserves the message for a certain period of time; it sends the message to the receiver (which in some embodiments will be one of the mirror nodes to 132N in the mirror farm 130), and when the receiver acknowledges receipt of the message the server can delete the message. Otherwise, the queue server module 134A may resend the message to the next available receiver.

In some alternative embodiments the change queue 134 is not ordered and a mirror node may simply select a change notification from the queue based on certain requirements (such as the computational resources available). That is, the change queue 134 may be unordered, ordered or partially ordered. In some embodiments, ordering may be important where multiple change notifications relate to the items or objects because in this case each change would be dependent on the previous change. However, ordering is less important when the change notifications relate to different items or objects as the changes are independent. In other embodiments, any change notification can be treated as a generic notification that a change has occurred on the primary cluster 110, in which case the temporary master mirror node may perform a differential operation between its local mirror copy and the primary cluster 110, and determine a delta to be applied to the temporary slave mirror nodes (132B to 132N).

In some embodiments, the change queue 134 may identify that multiple change notifications relate to the same objects.

It is to be noted that implementation of a distributed queue that is ordered is more complex. That is, for example, the change queue 134 may have to maintain an ordered log of all the messages and replicate the same ordering replicated across its servers. However, it is often possible, particularly in the source code repository examples provided in this disclosure, to consolidate multiple changes into a single change so that the queue may be implemented as an unordered queue.

Method Overview

Figure 3:
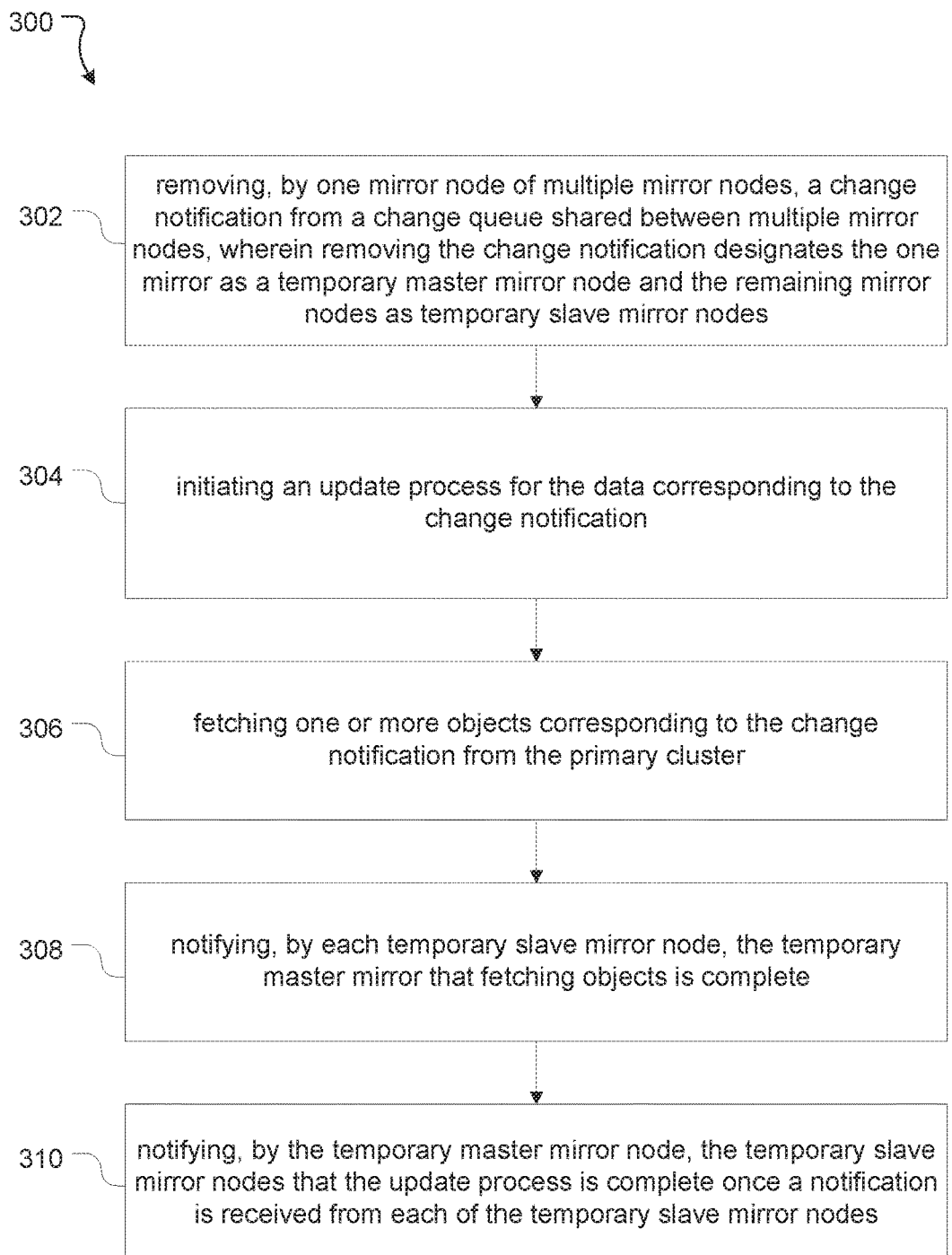
FIG. 3 is a flowchart of a method for consistent distributed mirroring of a primary cluster.

FIG. 3 illustrates an overview of an example method for consistent distributed mirroring of a primary cluster. This example method is performed by one mirror node of multiple mirror nodes.

The first step 302 is removing, by one mirror node such as mirror node 132A, a change notification from a change queue 134 shared between multiple mirror nodes (132A to 132N). Removing the change notification designates the one mirror as a temporary master mirror node and the remaining mirror nodes as temporary slave mirror nodes. This presumes that a mirror has already added a change notification to the change queue. This step 302 may be triggered by a mirror node (such as mirror node 132A) being notified there is a change notification in the change queue 134 or by the mirror node 132A listening for any additions to the change queue 134.

The second step 304 is initiating the update process for the changed data corresponding to the change notification. In some embodiments, initiating the update process blocks the temporary slave mirror nodes from performing a further update process while the update process is being executed. The temporary master mirror node (such as mirror node 132A) may identify one or more objects relating to the change notification or which may be affected by the update process. That is, not all objects in a change notification may need to be updated if a mirror node has the latest version of that object so the temporary master mirror node may seek to block the temporary slave mirror nodes in relation to only the one or more objects that need to be updated.

The third step 306 is fetching one or more objects corresponding to the change notification from the primary cluster 110.

The fourth step 308 is notifying, by each temporary slave mirror node, the temporary master mirror node that fetching objects is complete The final step 310 is notifying, by the temporary master mirror node, the temporary slave mirror nodes that the update process is complete once a notification is received from each of the temporary slave mirror nodes.

Detailed Method

Figure 4:
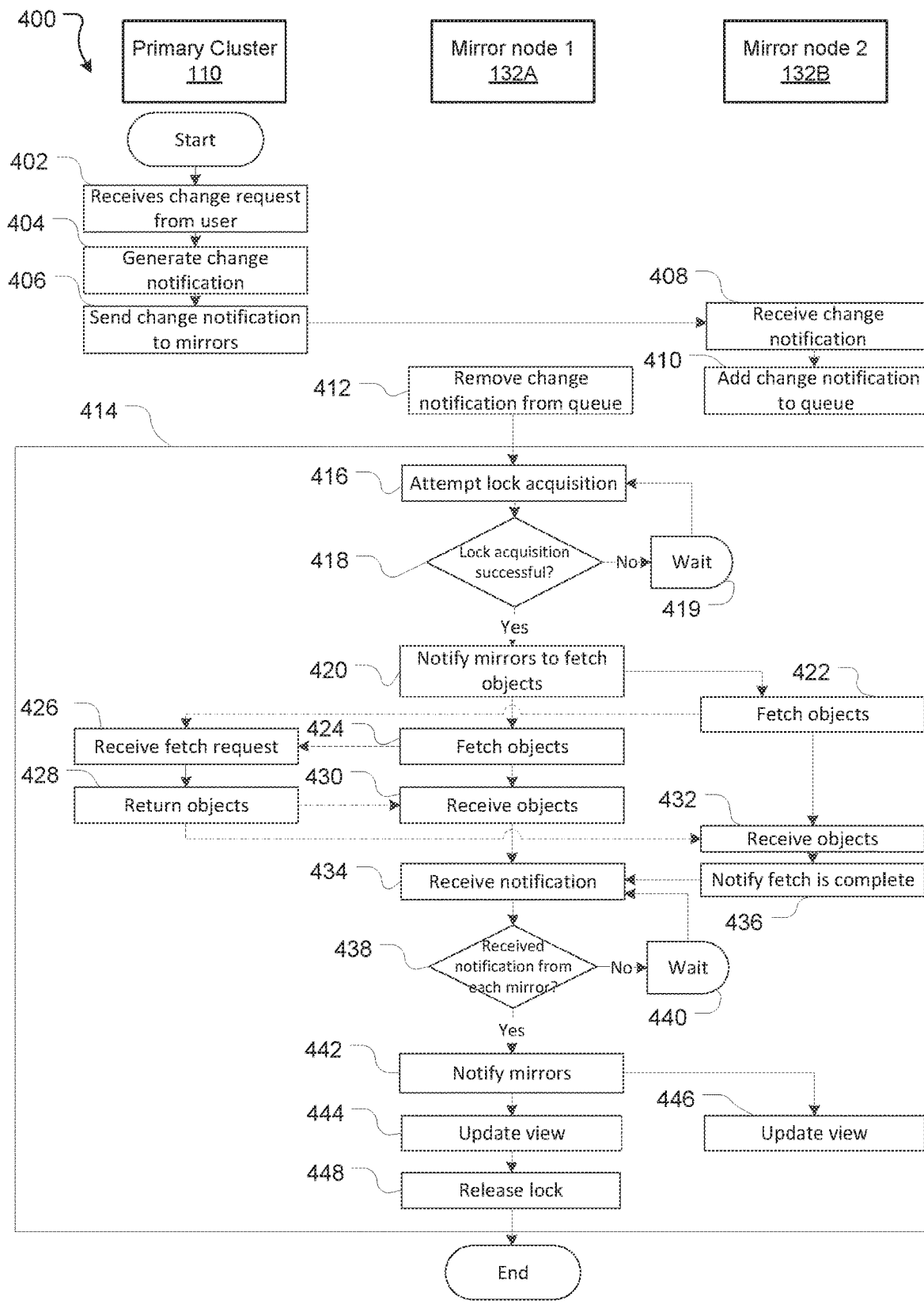
FIG. 4 is a flowchart of an example detailed method corresponding to the method of FIG. 3.

FIG. 4 illustrates a more detailed illustration of a method for consistent distributed mirroring of a primary cluster.

In this example, there are three components: primary cluster 110, mirror 1 132A and mirror 2 132B. In practice there are likely to be multiple mirror nodes (e.g. 30 or more depending on load requirements) mirror nodes and the method described in this disclosure could apply to any number of mirror nodes. This example is limited to two mirror nodes for illustrative purposes.

In this example, the primary cluster 110 is a version control source code repository (of which bitbucket and GIT are examples). The mirror nodes 132A and 132B serve read only copies of code that the primary cluster 110 is serving to users.

In this source code example, the primary cluster 110 is essentially maintaining a collection of commits to the source code. There are objects and refs, where each object relates to a commit in the source code and the refs are pointers into commit objects. In this example, there is a key-value data store where entering content into a repository provides a unique key which can be later used to retrieve that content. The refs are either the unique keys themselves or data that can be used to acquire or determine the keys (such as where a ref is a file that contains the unique key to an object). Typically, a unique key is a hash generated by a hash function such as SHA-1.

The method 400 begins when the primary cluster 110 receives 402 a change request from a user.

When the primary cluster 110 receives this change, the primary cluster 110 generates 404 a change notification. The change notification may depend on the type of data that the primary cluster 110 is serving. Although the method 400 may work with (or be adapted to work with) many different types of source code repositories, for example, the primary cluster 110 may be an upstream bitbucket server. In this case, the upstream bitbucket server can generate a change notification that includes objects as well as references to objects that have changed. In this case, a change notification with only references to the objects is needed.

Similarly, the primary cluster 110 may be a git server, the primary cluster 110 may generate a ref-file using either a git uploadpack—advertise-refs operation or a resurrected java based ref advertisement while at the same time the primary cluster 110 will check if the number of ref-files for a repository has exceeded a window and if so delete the last file. In this example, a ref change event may be created with the digest of the just generated ref-file as well as the previous ref-file digest and also a set of RefChanges that have been applied to the repository by a user's pushed changes.

At 406, the primary cluster 110 communicates the change notification to the mirror farm, which may be directed to a specific mirror via the load balancer 120B.

At 408, a mirror node 132 (e.g. mirror node 132B) receives the change notification communicated by the primary cluster 110.

At 410, the mirror node 132B, which is the mirror node that received the change notification, adds the change notification to the queue.

At 412, a mirror node (e.g. mirror node 132A) removes the change notification from the queue. In some embodiments a mirror node 132A may listen to the change queue and therefore will be notified (either as a push notification or via polling the queue on a regular basis) if there are any additions to the queue. This process 412 may be triggered if a mirror node 132A determines that there is sufficient computational resources available for the mirror node to perform the update, the mirror node 132A will remove the change notification from the queue to proceed with the update.

It is important to note at this point that the mirror node that adds the change notification to the change queue is not necessarily the same as the mirror that removes the change notification from the queue and manages the update process. This is because the mirror node that gets directed to add the change notification to the queue (for example directed by the load balancer 120B or in alternative embodiments by the primary cluster 110 itself) may not have capacity to perform the update process for the change notification. Another mirror node with more capacity may therefore perform the update process.

In the example of FIG. 4, it is mirror node 2 132B that receives 408 the change notification from the primary cluster 110 and adds 410 the change notification to the queue. Mirror node 1 132A removes the change notification from the queue at 412 and begins the update process 414 in relation to the change corresponding to the change notification.

In this example mirror node 1 132A is designated as a temporary master mirror node and mirror node 2 132B is designated as a temporary slave mirror node. These roles will be in place until the update process in relation to the change has finished. In certain embodiments it is possible for a mirror node to be both a temporary slave mirror node and a temporary master mirror node where the designation is different in relation to different updates or different repositories. That is, a temporary master mirror node or temporary slave mirror node designation can be done per update process or per repository basis. In alternative embodiments, it is still possible that a temporary master mirror node or temporary slave mirror node designation can be done on a global basis.

At 416, the designated temporary master mirror node attempts to acquire a lock across the mirror nodes 132A to 132N (in this case 132A and 132B) to ensure that no other mirror nodes are performing an update process or that no other mirror nodes are performing an update process on the same data (that is, the same objects in the source code repository example). In some embodiments, the temporary master mirror node 132A may only try to acquire a lock on a subset of the data that the mirror is maintaining. For example, if the change relates to a branch of source code, then a lock may be acquired only in relation to that branch or the objects that relate to that branch. This allows other branches of that source code to be updated in parallel, and further update processes to be performed if a change notification in respect of those other branches is received while the current update process is being performed.

At 418, the temporary master mirror node 132A determines whether the lock acquisition attempted at 416 was successful or not.

In this example method, if the lock acquisition is not successful, the temporary master mirror node 132A may wait (at 419) a specified period of time such as 100 ms before returning to 416 to try again to acquire the lock. In certain embodiments, if the lock cannot be obtained within a predetermined number of attempts the process terminates and the change notification is returned to the queue. In some embodiments, the change notification may be added to a retry queue. A mirror that finishes an operation may then examine the retry queue. If the retry queue is not empty, the mirror may give precedence to any change notifications that are in the retry queue.

If the lock acquisition is determined to be successful at 418, the temporary master mirror node 132A will notify 420 the other mirror nodes to fetch the objects from the primary cluster 110 (for example the upstream server). In this example, the temporary master mirror node 132A will fetch 424 objects in parallel to the temporary slave mirror nodes 132B fetching 422 objects from the primary cluster 110.

Further in this example, the primary cluster 110 (for example the upstream server) will receive 426 each fetch request and return 428 the objects to both the temporary master mirror node 132A and the temporary slave mirror node 132B. In some embodiments, the temporary master mirror node will perform a differential computation to determine how much the data or objects relating to the change notification have changed and then send the difference to the mirror nodes. This may assist with reducing network traffic and any lag in update between the primary cluster 110 and the mirror nodes. In other embodiments, the primary cluster 110 will perform this differential computation and send the difference to the temporary master mirror node, which can then pass the difference to the temporary slave mirror nodes.

The temporary master mirror node 132A receives 430 the objects from the primary cluster 110. Similarly, the temporary slave mirror node 132B receives 432 the objects from the primary cluster 110 in parallel. Again, in some embodiments the temporary slave mirror node 132B may receive the objects from the temporary master mirror node 132A.

Once a temporary slave mirror node 132B has received the objects, it will notify 426 the temporary master mirror node 132A that the fetch is complete.

At 434 the temporary master mirror node 132A receives these notifications.

At 438, the temporary master mirror node 132A determines whether notifications have been received from all of the temporary slave mirror nodes.

If not all the notifications have been received, then the temporary master mirror node 132A waits (at 440) for the remaining notifications. There may be a threshold timeout period for notifications from the temporary slave mirror nodes. In some embodiments, any operation may be retried multiple times up to a specified limit/threshold. If one or more temporary slave mirror nodes still do not respond within the threshold timeout period, then the temporary master mirror node 132A may simply remove the non-responding temporary slave mirror nodes from the group or cluster and proceed with only the responding temporary slave mirror nodes. In some cases, particularly where there is limited capacity, the temporary master mirror node may notify an administrator for approval of removing one or more nodes prior to proceeding.

In this example the temporary master mirror node 132A only has to wait from a notification from the single temporary slave mirror node 132B. However, it is to be noted that this is simplified for illustrative purposes. In practice there are likely to be many more mirror nodes (e.g. 30 or more) mirror nodes. As the number of mirror nodes 132 increases, so too does the likelihood that one or more mirror nodes may fail to notify the temporary master mirror nodes.

At 442, once the temporary master mirror node 132A has determined that notifications have been received from each slave mirror node (or alternatively one or more timeouts have occurred), the temporary master mirror node 132A notifies the temporary slave mirror nodes 132B that the update process has been completed. The temporary master mirror node 132A will update 444 its view in parallel with each of the temporary slave mirror nodes 132B updating 446 their view. This means that a user requesting content from the mirror nodes will be served the updated content.

As a final step the temporary master mirror node 132A releases 448 the locks acquired at step 416 by beginning the update process 414. Once the lock has been released, the roles of temporary master mirror node and temporary slave mirror nodes are relinquished and the mirror nodes 132A and 132B are simply normal mirror nodes again until another update process occurs. The lock acts to ensure that any requests for an update to the same data while the update process 414 is being performed will be rejected or delayed. This lock also acts to provide consistency as prior to the view being updated, each of the mirror nodes will still serve the content, but the user would be served the old content instead of updated content. This method 400 seeks to ensure that the mirror nodes will either all serve old content, or all serve updated content, which is ideal from for consistency. Importantly, unless there is a synchronization issue, it is unlikely that some of the mirror nodes will serve old content while some of the mirror nodes serve updated content, which would be problematic for consistency. That is, it is generally better for the mirror nodes to be consistent than it is for only some of the mirror nodes to be serving updated content.

As referred to above, it is possible that one mirror may be a temporary master mirror node in relation to one change, but a temporary slave mirror node in relation to another change. In some embodiments, it is possible that a mirror node can be a temporary master mirror node for multiple changes and equally a temporary slave mirror node for multiple changes as well.

In some embodiments the temporary master mirror node 132A will fetch the objects from the primary cluster 110 and then send the objects to the temporary slave mirror nodes itself (alleviating the need for each temporary slave mirror node to obtain the objects from the primary cluster 110). In this case, the temporary master mirror node 132A may perform the differential computation to determine how much the relevant data relating to the change notification have changed and then send the difference to the temporary slave mirror nodes. As above, this may assist with reducing network traffic and any lag in update between the primary cluster 110 and the mirror nodes.

In other alternative embodiments, a specified timeout period to elapse in which case the method may continue without a notification from one or more temporary slave mirror nodes. This is to take into account edge cases where a mirror node does not respond during the update process 414. A mirror node that fails to perform the update and respond within the specific timeout period may be notified by the temporary master mirror node to stop serving user requests until the mirror node is synchronized with the rest of the mirror farm. If the mirror node fails, it is to be understood that recovery processes may be used to ensure that the mirror farm remains synchronized with each other and with the primary cluster 110. In some embodiments there may be a full system synchronization at scheduled intervals so a mirror node may only be out of synchronization for a short period of time.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense As used herein the terms "include" and "comprise" (and variations of those terms, such as "including", "includes", "comprising", "comprises", "comprised" and the like) are intended to be inclusive and are not intended to exclude further features, components, integers or steps.

Various features of the disclosure have been described using flowcharts. Although these flowcharts define steps in particular orders to explain various features, in some cases the steps may be able to be performed in a different order. Furthermore, in some cases one or more steps may be combined into a single step, a single step may be divided into multiple separate steps, and/or the function(s) achieved by one or more of the described/illustrated steps may be achieved by one or more alternative steps. Still further, the functionality/processing of a given flowchart step could potentially be performed by various different systems or applications.

It will be understood that the invention disclosed and defined in this specification extends to all alternative combinations of two or more of the individual features mentioned or evident from the text or drawings. All of these different combinations constitute various alternative aspects of the invention.

What is claimed is:

1. A computer implemented method for consistent distributed mirroring of data maintained by a primary cluster comprising:

removing, by one mirror node of multiple mirror nodes, a change notification from a change queue shared between multiple mirror nodes, wherein removing the change notification designates the one mirror as a temporary master mirror node and the remaining mirror nodes as temporary slave mirror nodes;

initiating an update process for the data corresponding to the change notification;

fetching one or more objects corresponding to the change notification from the primary cluster;

notifying, by each temporary slave mirror node, the temporary master mirror node that fetching objects is complete; and notifying, by the temporary master mirror node, the temporary slave mirror nodes that the update process is complete once a notification is received from each of the temporary slave mirror nodes.

2. A computer implemented method according to claim 1 further comprising adding a change notification to the change queue wherein the change notification indicates a change at the primary cluster from old data to updated data.

3. A computer implemented method according to claim 1 wherein the queue shared between multiple mirror nodes is a distributed queue.

4. A computer implemented method according to claim 1 wherein the change notification contains references to objects that have been modified corresponding to updated data.

5. A computer implemented method according to claim 4 wherein the changed data is based on a differential computation between old objects maintained by the mirror nodes and modified objects on the primary cluster.

6. A computer implemented method according to claim 5 wherein initiating the update process comprises notifying the temporary slave mirror nodes that an update is occurring.

7. A computer implemented method according to claim 1, further comprising updating, by a mirror node, a view to serve content based on the updated data after receiving notification that the update process is complete.

8. A computer implemented method according to claim 1 further comprising condensing multiple change notifications in the change queue into a single change notification if the multiple change notifications correspond to the same objects.

9. A computer implemented method according to claim 1 wherein fetching one or more objects comprises the temporary master mirror node fetching the one or more objects from the primary cluster and each temporary slave mirror fetching the one or more objects from the temporary master mirror node.

10. A computer implemented method according to claim 1 wherein initiating the update process comprises blocking the temporary slave mirror nodes from performing a further update process while the update process is being executed.

11. A computer implemented method according to claim 10 wherein blocking the temporary slave mirror nodes comprises identifying one or more objects that are affected by the update process and blocking the temporary slave mirror nodes in relation to the one or more objects.

12. A computer system comprising multiple mirror nodes, wherein each mirror comprises:

a processor;
a communication interface;
a display; and
a non-transitory computer-readable storage medium storing sequences of instructions, which when executed by the processor, cause the processor to perform one or more of the following:

remove, by one mirror node of multiple mirror nodes, a change notification from a change queue shared between multiple mirror nodes, wherein removing the change notification designates the one mirror as a temporary master mirror node and the remaining mirror nodes as temporary slave mirror nodes;

initiate an update process for the data corresponding to the change notification;

fetch one or more objects corresponding to the change notification from the primary cluster;

notify, by each temporary slave mirror node, the temporary master mirror node that fetching objects is complete; and notify, by the temporary master mirror node, the temporary slave mirror nodes that the update process is complete once a notification is received from each of the temporary slave mirror nodes.

13. A computer system according to claim 12, wherein when executed the sequences of instructions further cause the processor to:

add a change notification to the change queue wherein the change notification indicates a change at the primary cluster from old data to updated data.

14. A computer system according to claim 12, wherein the queue shared between multiple mirror nodes is a distributed queue.

15. A computer system according to claim 12, wherein the change notification contains references to objects that have been modified corresponding to updated data.

16. A computer system according to claim 15, wherein the changed data is based on a differential computation between old objects maintained by the mirror nodes and modified objects on the primary cluster.

17. A computer system according to claim 16, wherein initiating the update process comprises notifying the temporary slave mirror nodes that an update is occurring.

18. A computer system according to claim 12, wherein when executed the sequences of instructions further cause the processor to:

update, by a mirror node, a view to serve content based on the updated data after receiving notification that the update process is complete.

19. A computer system according to claim 12, wherein when executed the sequences of instructions further cause the processor to:

condense multiple change notifications in the change queue into a single change notification if the multiple change notifications correspond to the same objects.

20. A computer system according to claim 12, wherein fetching one or more objects comprises the temporary master mirror node fetching the one or more objects from the primary cluster and each temporary slave mirror fetching the one or more objects from the temporary master mirror node.

* * * * *